US012691944B2

(12) United States Patent
Hennessey

(10) Patent No.: US 12,691,944 B2
(45) Date of Patent: Jul. 28, 2026

(54) STRUCTURAL ASSEMBLY HAVING POCKETS

(71) Applicant: Ford Global Technologies, LLC, Dearborn, MI (US)

(72) Inventor: Conor Daniel Hennessey, South Hadley, MA (US)

(73) Assignee: Ford Global Technologies, LLC, Dearborn, MI (US)

( * ) Notice: Subject to any disclaimer, the term of this patent is extended or adjusted under 35 U.S.C. 154(b) by 320 days.

(21) Appl. No.: 18/599,561

(22) Filed: Mar. 8, 2024

(65) Prior Publication Data

US 2025/0282423 A1 Sep. 11, 2025

(51) Int. Cl.
*B62D 21/00* (2006.01)
*B62D 21/15* (2006.01)

(52) U.S. Cl.
CPC .................................. *B62D 21/155* (2013.01)

(58) Field of Classification Search
CPC ... B62D 21/155; B62D 21/152; B62D 21/157
USPC ..................................................... 296/187.01
See application file for complete search history.

(56) References Cited

U.S. PATENT DOCUMENTS

| | | | |
|---|---|---|---|
| 5,752,564 A | 5/1998 | Callahan et al. | |
| 7,591,502 B2 * | 9/2009 | Hedderly ............... | B62D 33/06 296/203.02 |
| 7,677,649 B2 * | 3/2010 | Hedderly ........... | B62D 25/2009 296/29 |
| 8,177,277 B2 * | 5/2012 | Hedderly ............... | B62D 23/00 296/203.03 |
| 8,186,965 B2 | 5/2012 | Kuhne et al. | |
| 2003/0069321 A1 | 4/2003 | Lin et al. | |

* cited by examiner

*Primary Examiner* — Steven O Douglas
(74) *Attorney, Agent, or Firm* — Burris Law, PLLC

(57) ABSTRACT

A structural assembly for a vehicle includes a cast body having a main wall, a non-circular shaped pocket formed in the main wall, and at least one mounting feature. The pocket is defined at least partially by a base wall and an arcuate wall. The base wall has a first end and a second opposing end. The arcuate wall extends in a first direction from the first end of the base wall to the main wall. The arcuate wall also extends from a first side of the pocket to a second opposing side of the pocket. The mounting feature extends in a second direction from the base wall that is opposite the first direction and is configured to be coupled to a vehicle component.

20 Claims, 10 Drawing Sheets

STRUCTURAL ASSEMBLY HAVING POCKETS

FIELD

The present disclosure relates to a structural assembly having pockets.

BACKGROUND

The statements in this section merely provide background information related to the present disclosure and does not constitute prior art.

Vehicle structures may be manufactured by a casting process including filling molten or semisolid material into a mold and then hardening the material into a shape defined by the mold. The vehicle structure manufactured by the casting process may include features that allow the structure to interact (e.g., be secured) to other components or parts of the vehicle.

The present disclosure addresses the mechanical properties of the structural castings, which may include features that interact to other components or parts of the vehicle.

SUMMARY

This section provides a general summary of the disclosure and is not a comprehensive disclosure of its full scope or all of its features.

In one form, the present disclosure provides a structural assembly for a vehicle that includes a cast body. The cast body includes a main wall, a non-circular shaped first pocket formed in the main wall, and at least one mounting feature. The first pocket is defined at least partially by a base wall and an arcuate wall. The base wall has a first end and a second opposing end. The arcuate wall extends in a first direction from the first end of the base wall to the main wall. The arcuate wall also extends from a first side of the first pocket to a second opposing side of the first pocket. The mounting feature extends in a second direction from the base wall that is opposite the first direction. The feature is also configured to be coupled to a vehicle component.

In variations of the structural assembly of the above paragraph, which can be implemented individually or in any combination: the mounting feature includes a plurality of mounting features extending in the second direction from the base wall; the mounting feature is a boss, the boss comprises an aperture extending at least partially therethrough; the boss comprises a length having a variable thickness; the boss has a proximal end and a distal end, the proximal end has a greater thickness than a thickness of the distal end; the first pocket has a Kammtail virtual foil profile; the base wall is planar; the cast main body further includes a non-circular shaped second pocket, the second pocket has a Kammtail virtual foil profile; the first pocket extends in a third direction and the second pocket extends in a fourth direction, the third direction different from the fourth direction; the first pocket extends perpendicular to the mounting feature; and the cast main body is a front-end structure of the vehicle, the front end structure includes a left upper rail and a right upper rail.

In another form, the present disclosure provides a structural assembly for a vehicle that includes a cast body. The cast body includes a main wall, a non-circular shaped first pocket formed in the main wall, and a plurality of bosses. The first pocket is defined at least partially by a base wall and an arcuate wall. The base wall has a first end and a second opposing end that is straight. The arcuate wall extends in a first direction from the first end of the base wall to the main wall. The arcuate wall also extends from a first side of the first pocket to a second opposing side of the first pocket. Each boss of the plurality of bosses extend in a second direction from the base wall and comprises an aperture extending at least partially therethrough. The second direction is opposite the first direction. Each boss of the plurality of bosses is configured to be coupled to a vehicle component.

In variations of the structural assembly of the above paragraph, which can be implemented individually or in any combination: each boss has a proximal end and a distal end, the proximal end has a greater thickness than a thickness of the distal end; the first pocket has a Kammtail virtual foil profile; the cast body further includes a non-circular shaped second pocket, the second pocket has a Kammtail virtual foil profile; the first pocket extends in a third direction and the second pocket extends in a fourth direction, the third direction different from the fourth direction; the cast body is a front-end structure of the vehicle, the front end structure includes a left upper rail and a right upper rail; and the main wall is inclined.

In yet another form, the present disclosure provides a structural assembly for a vehicle that includes a cast body. The cast body includes a main wall, a plurality of non-circular shaped pockets formed in the main wall, and a plurality of bosses. Each pocket is defined at least partially by a base wall and an arcuate wall. The base wall has a first end and a second opposing end that is straight. The arcuate wall extends in a first direction from the first end of the base wall to the main wall. The arcuate wall also extends from a first side of the first pocket to a second opposing side of the first pocket. Each boss of the plurality of bosses extend in a second direction from the base wall that is opposite the first direction. Each boss is configured to be coupled to a vehicle component and includes a proximal end and a distal end. The proximal end has a greater thickness than a thickness of the distal end. A first non-circular shaped pocket of the plurality of non-circular shaped pockets extends in a third direction and a second non-circular shaped pocket of the plurality of non-circular shaped pockets extends in a fourth direction. The third direction different from the fourth direction.

In variations of the structural assembly of the above paragraph, each non-circular shaped pocket of the plurality of non-circular shaped pockets has a Kammtail virtual foil profile.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
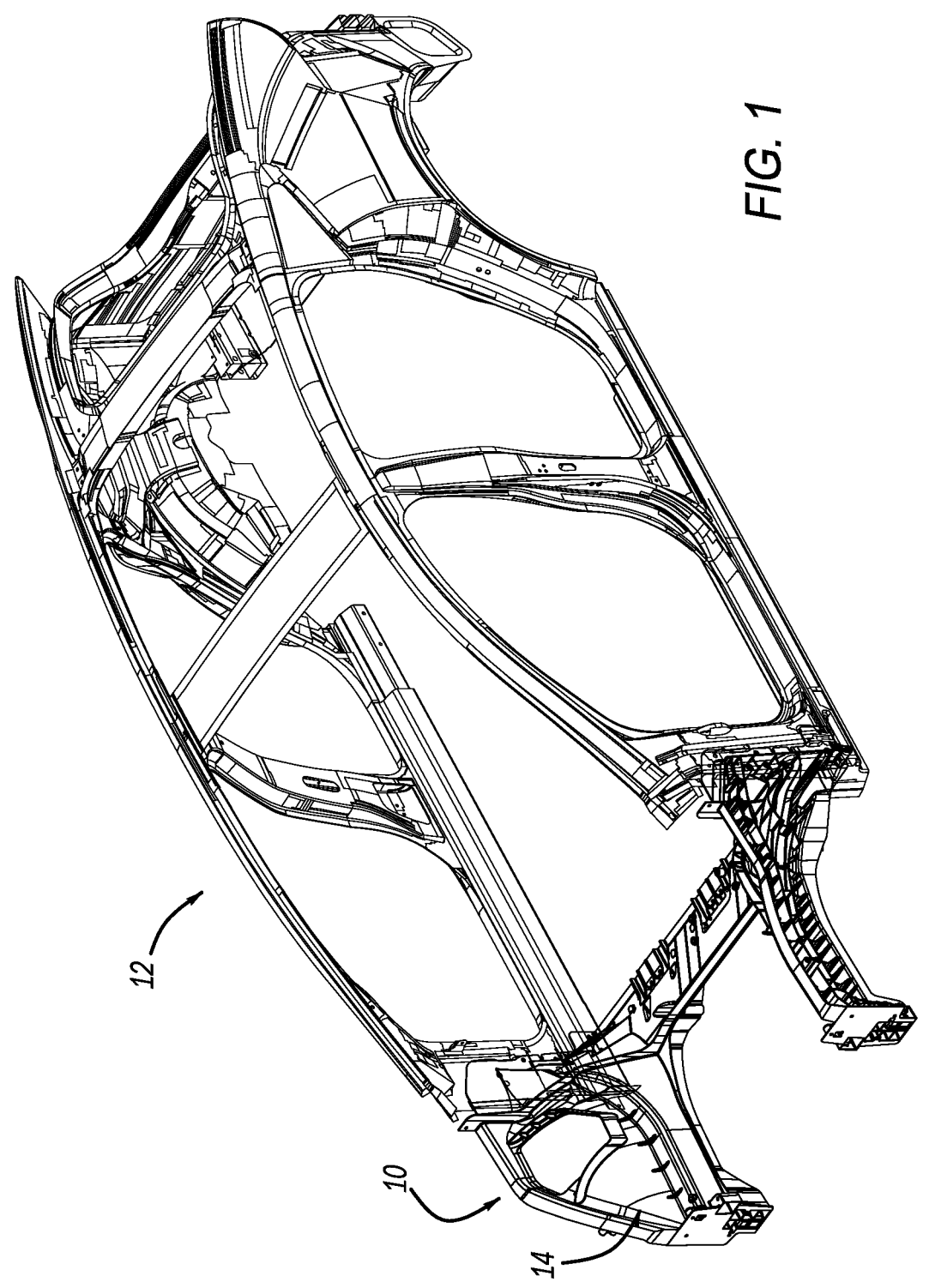
FIG. 1 is a perspective view of a portion of a vehicle body including a structural assembly having a casting according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a vehicle 12 including a structural assembly 10 is provided. In the example illustrated, the vehicle 12 is of a uni-body construction. In some forms, the vehicle 12 may be a body-on-frame architecture. In some forms, the vehicle 12 can be an electric vehicle. In other forms, the vehicle 12 can have an internal combustion engine (ICE). Still, in other forms, the vehicle 12 can be a hybrid electric vehicle (HEV). The structural assembly 10 according to the present disclosure includes a casting or cast main body 14 and a pair of strut caps (not shown) secured to the casting 14.

A "casting" 14 as used herein is a product that is manufactured by a casting process, i.e., by filling molten or semisolid material into a mold and then hardening the material into a shape defined by the mold. The casting 14 includes a plurality of structural components joined together in the casting process. The plurality of structural components form structural load paths and extend in a plurality of directions in a 3D space. That is, the casting process providing the casting 14 with modes of deformation and energy absorption throughout 3D space that absorbs energy more readily than forming each component separately and joining them later. By forming the casting 14 with the casting process, the casting 14 increases uniformity of energy absorption characteristics throughout the structural components and reducing overall weight of portions of the structural assembly 10. The casting process reduces machining of the structural components upon forming the casting 14, reducing manufacturing time.

The casting 14 is formed of a cast-allowable alloy material, i.e., a material that is able to be used in the casting process. As described above, the material used in the casting process is heated to a liquid or semisolid phase and then introduced to the mold to form the casting 14. The cast-allowable alloy material can be, e.g., one of an aluminum alloy, a fiber-reinforced aluminum, a fiber-reinforced magnesium, etc. The cast-allowable alloy material may have a lower weight, ductility, and/or toughness than other materials used in vehicle components. That is, the cast-allowable alloy material may be less ductile and may have a lower toughness than other materials that are not able to be used in the casting process. The lower weight of the cast-allowable alloy reduces overall weight of the vehicle 12.

Figure 2:
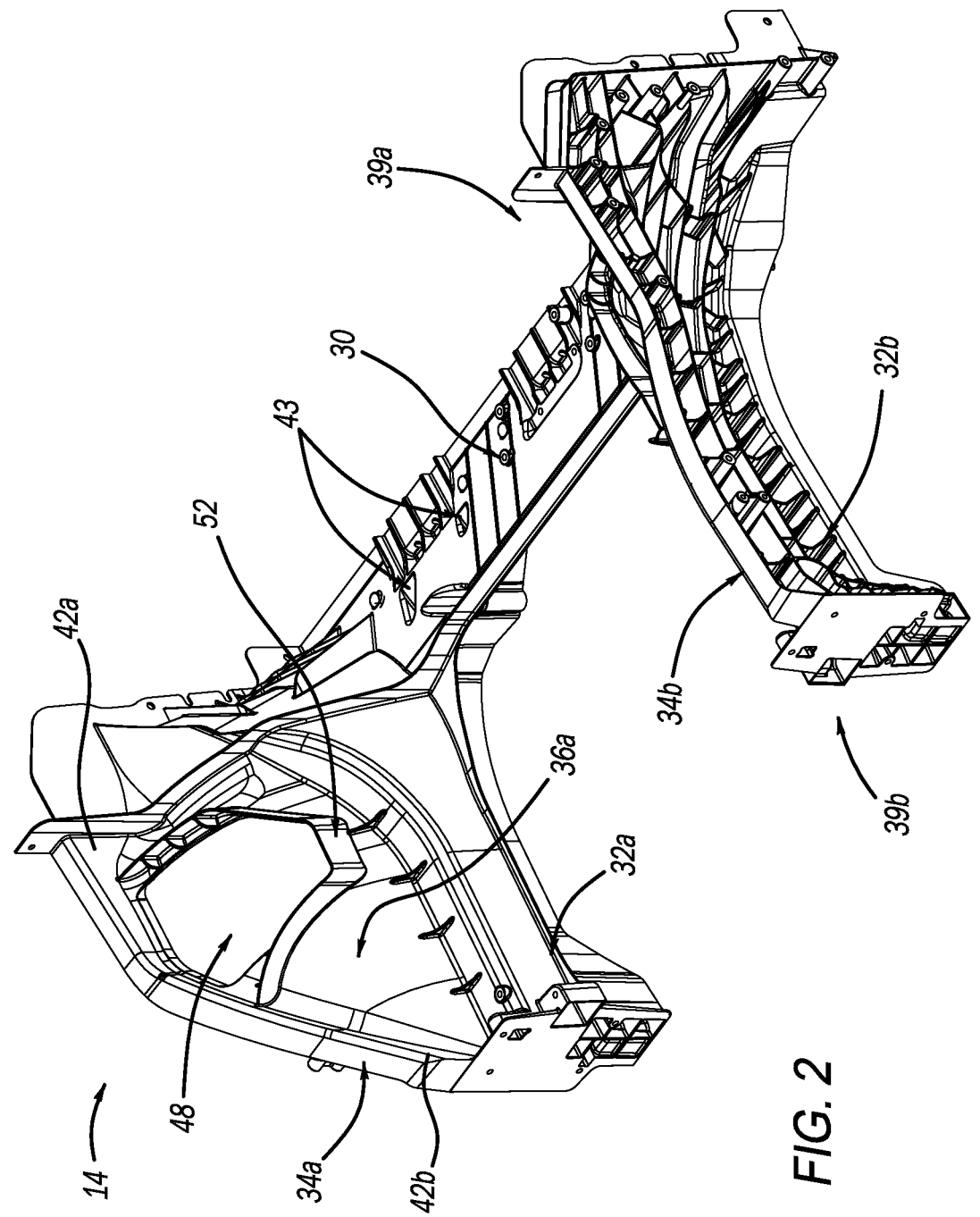
FIG. 2 is a perspective view of the casting of the structural assembly of FIG. 1.
Figure 3:
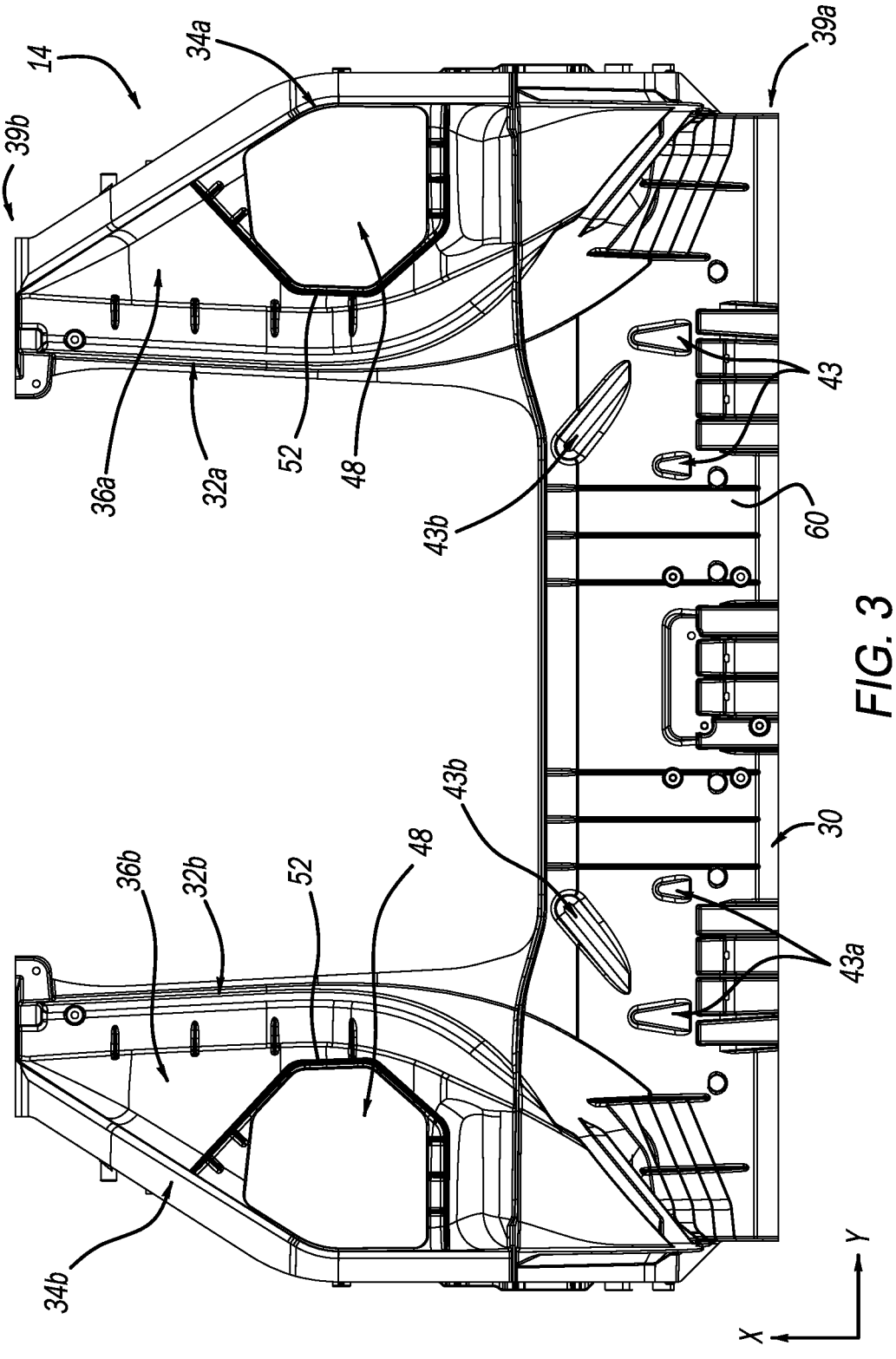
FIG. 3 is a top view of the casting of the structural assembly of FIG. 1.
Figure 4A:
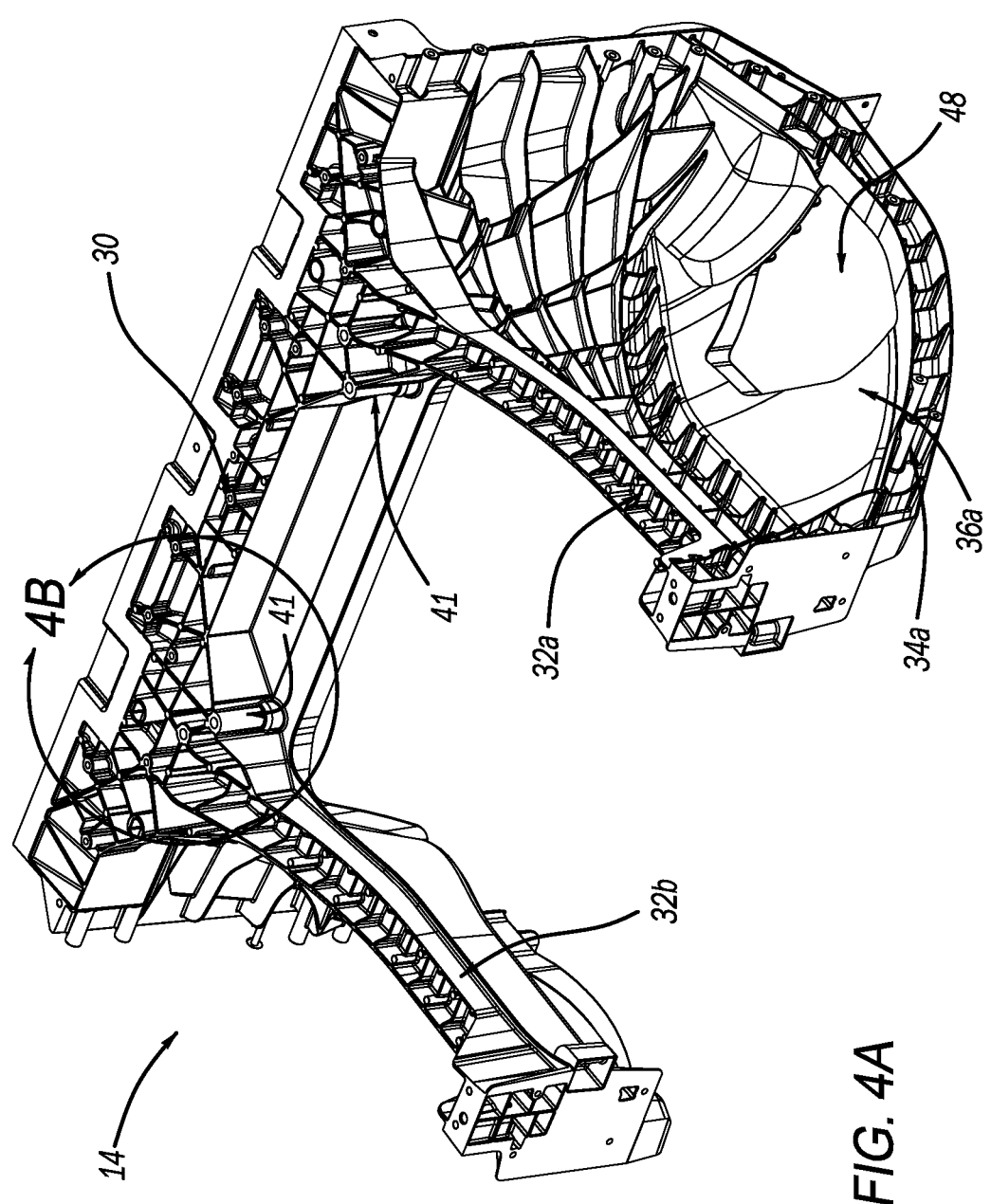
FIG. 4A is a perspective bottom view of the casting of the structural assembly of FIG. 1.

Referring to FIGS. 2, 3, 4A, the casting 14 may be of a front end of the vehicle 12 and may be secured to a subframe (not shown) of the vehicle 12 such that the subframe is supported by the casting 14. In the example illustrated, the casting 14 includes a front dash cross member 30, a pair of opposed beams or inner rails 32a, 32b, a pair of opposed upper rails 34a, 34b, a pair of opposed aprons 36a, 36b, a plurality of mounting features 41 and a plurality of pockets 43a, 43b (together referred to as pockets 43). A bumper (not shown) extends in a transverse direction Y relative to a longitudinal direction X of the vehicle 12 and is secured to front ends of the pair of beams 32a, 32b. The front dash cross member 30 extends in the transverse direction Y at a rear end 39a of the casting 14 and connects to the mid inner rails 32a, 32b and the subframe (not shown). Each beam 32a, 32b extends from a lower portion of a respective hinge pillar to the bumper. Each beam 32a, 32b is also arcuate and extends around a front wheel (not shown) of the vehicle 12 and forms a portion of a respective front wheel well. The upper rails 34a, 34b are positioned above the beams 32a, 32b and extend from an upper portion of a respective hinge pillar to a front end of a respective beam 32a, 32b. Stated differently, each upper rail 34a, 34b includes a first end 42a located at the upper portion of the respective hinge pillar and a second end 42b located at the front end of the respective beam 32a, 32b.

In the example illustrated, each apron 36a, 36b is arcuate and extends from a respective upper rail 34a, 34b to a respective beam 32a, 32b. In this way, each apron 36a, 36b is located between the respective upper rail 34a, 34b and the respective beam 32a, 32b. Each apron 36a, 36b also extends from the rear end 39a of the casting 14 to the front end 39b of the casting 14 and includes an opening 48 formed therein. That is, the opening 48 extends through each apron 36a, 36b such that one or more components (not shown) of the vehicle suspension system (not shown) may extend through (or pass through) the opening 48. In the example illustrated, the opening 48 formed in the apron 36a, 36b is located closer toward a respective upper rail 34a, 34b than a respective beam 32a, 32b. In the example illustrated, each apron 36a, 36b includes a mounting feature or flange 52 that permits strut caps (not shown) to be mounted to the casting 14. In the example illustrated, the mounting feature 52 extends upward from the apron 36a, 36b and extends at least partially around the opening 48 in the apron 36a, 36b.

Each strut cap (not shown) is secured to the mounting feature 52 of a respective apron 36a, 36b of the casting 14 and stores at least a portion of the vehicle suspension system. One example of such a strut cap is disclosed in the U.S. patent application Ser. No. 18/599,541, filed on the same day as the present application, and titled "VEHICLE STRUCTURAL ASSEMBLY HAVING STRUT CAPS," which is commonly owned with the present application and the contents of which are incorporated herein by reference in its entirety.

Figure 4B:
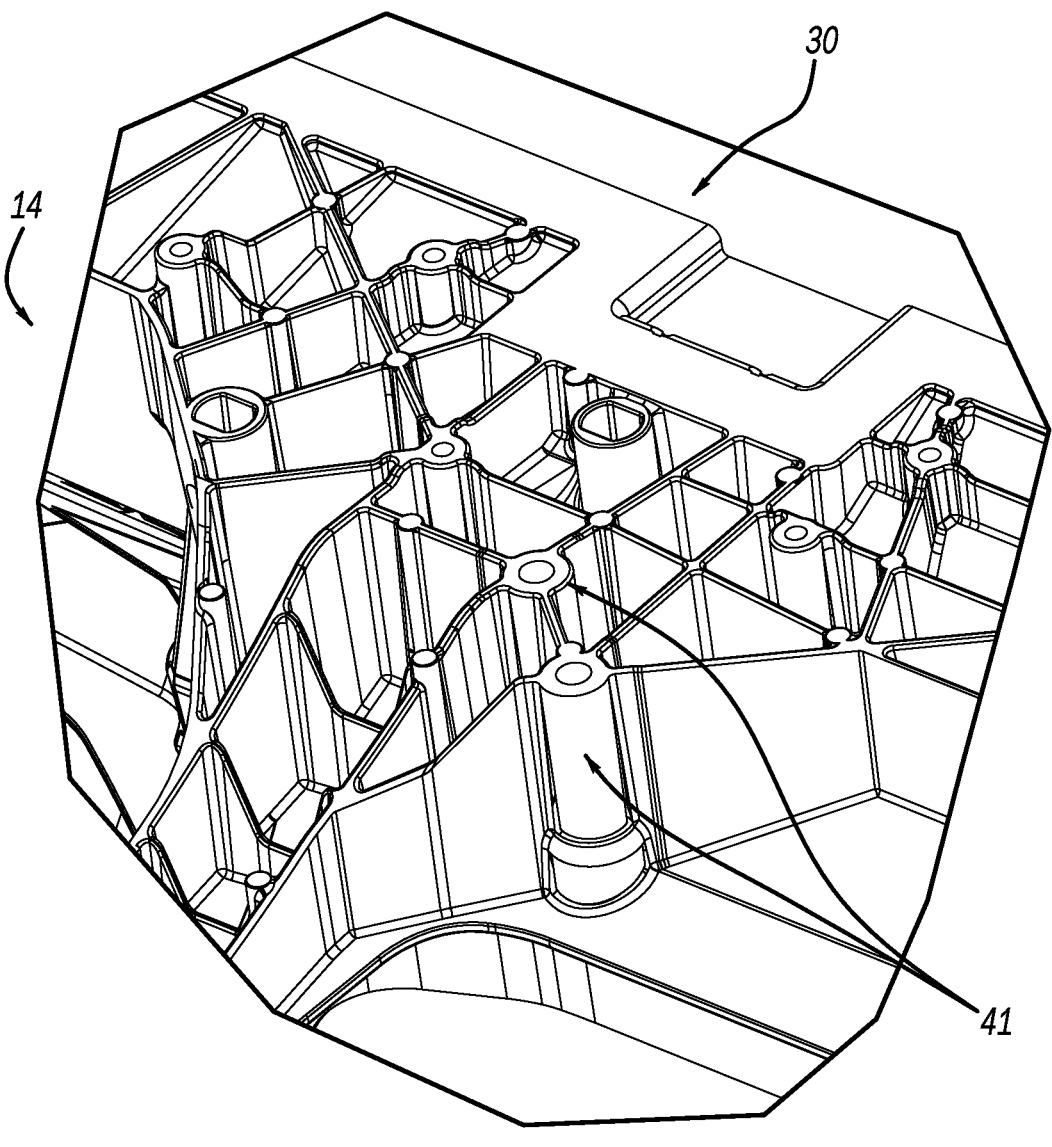
FIG. 4B is a perspective view of a portion of the structural assembly indicated as 4B in FIG. 4A.
Figure 6:
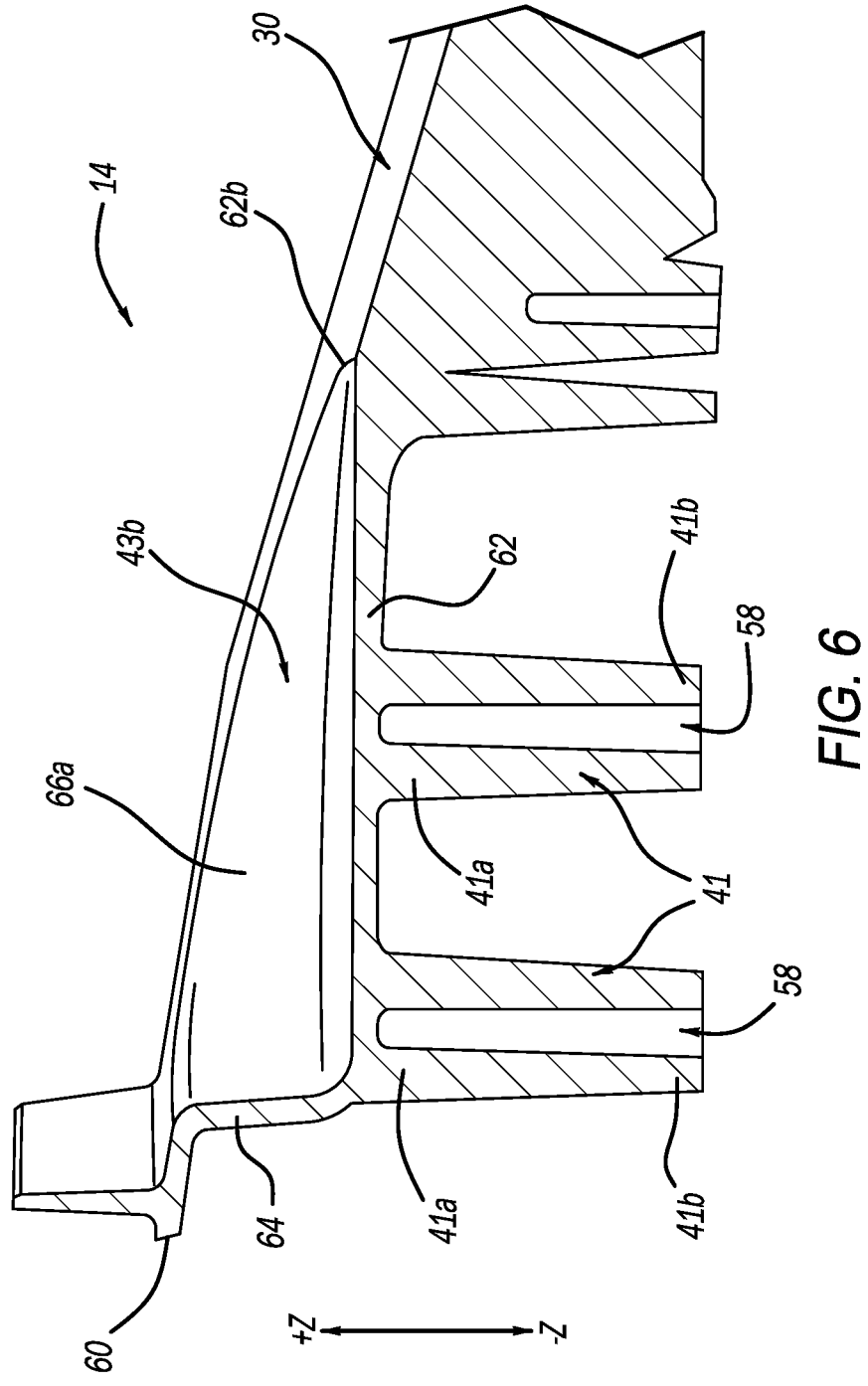
FIG. 6 is a cross-sectional view of the casting of the structural assembly of FIG. 5 taken along line 6-6.

With reference to FIGS. 4A, 4B, and 6, the plurality of mounting features 41 extend from the casting 14 and are attached to a portion of the vehicle 12. For example, one or more mounting features 41 may be located in the area of the front dash cross member 30 and may secure the subframe (not shown) to the casting 14. In another example, one or more mounting features 41 may be located in the areas of the aprons 36a, 36b, the upper rails 34a, 34b, and/or the beams 32a, 32b and may secure different parts or components of the vehicle 12 to the casting 14. The mounting features 41 may have different lengths and/or thicknesses. As shown in FIG. 6, each mounting feature 41 includes a proximal end 41*a* extending from the casting 14 and a distal end 41*b*. In some forms, the mounting feature 41 has a variable thickness from the proximal end 41*a* to the distal end 41*b*. In one example, the proximal end 41*a* has a thickness that is greater than a thickness of the distal end 41*a*. Stated differently, the mounting feature 41 is tapered from the proximal end 41*a* to the distal end 41*b*. In some forms, the mounting feature 41 has a constant thickness from the proximal end 41*a* to the distal end 41*b*. In the example illustrated, each mounting feature 41 is a boss that includes an aperture 58 extending at least partially therethrough and that is configured to receive a fastener (e.g., bolt, screw, and/or rivet). In some forms, the aperture 58 may be threaded.

With reference to FIGS. 2 and 3, the pockets 43 are formed in the front dash cross member 30 of the casting 14. In some forms, the pockets 43 may be formed at other areas of the casting 14 such as the aprons 36*a*, 36*b*, for example. In the example illustrated, the pockets 43 are formed in a wall 60 of the front dash cross member 30 and may extend in different directions. For example, one or more pockets 43*a* may have a length that extends along a longitudinal direction X of the vehicle 12 and/or one or more pockets 43*b* may have a length that extends at an angle relative to the longitudinal and transverse directions X, Y of the vehicle. As shown in FIG. 3, pockets 43*b* extends in direction that is angled (e.g., acute angle) relative to the longitudinal and transverse directions X, Y. In the example illustrated, the wall 60 is angled or slanted. In some forms, the wall 60 is planar or flat.

Figure 5:
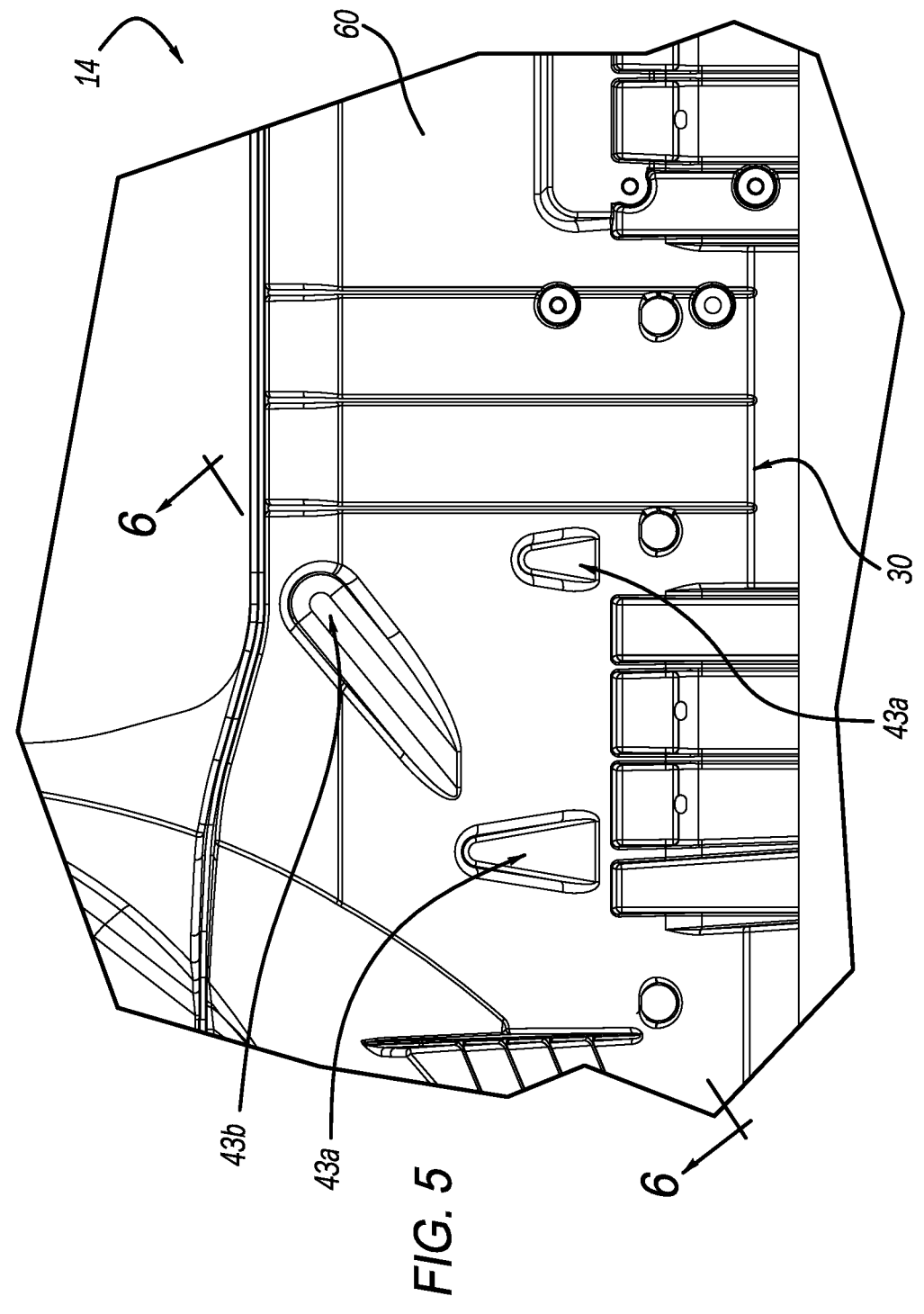
FIG. 5 is a perspective view of a portion of the casting of the structural assembly of FIG. 1.
Figure 7:
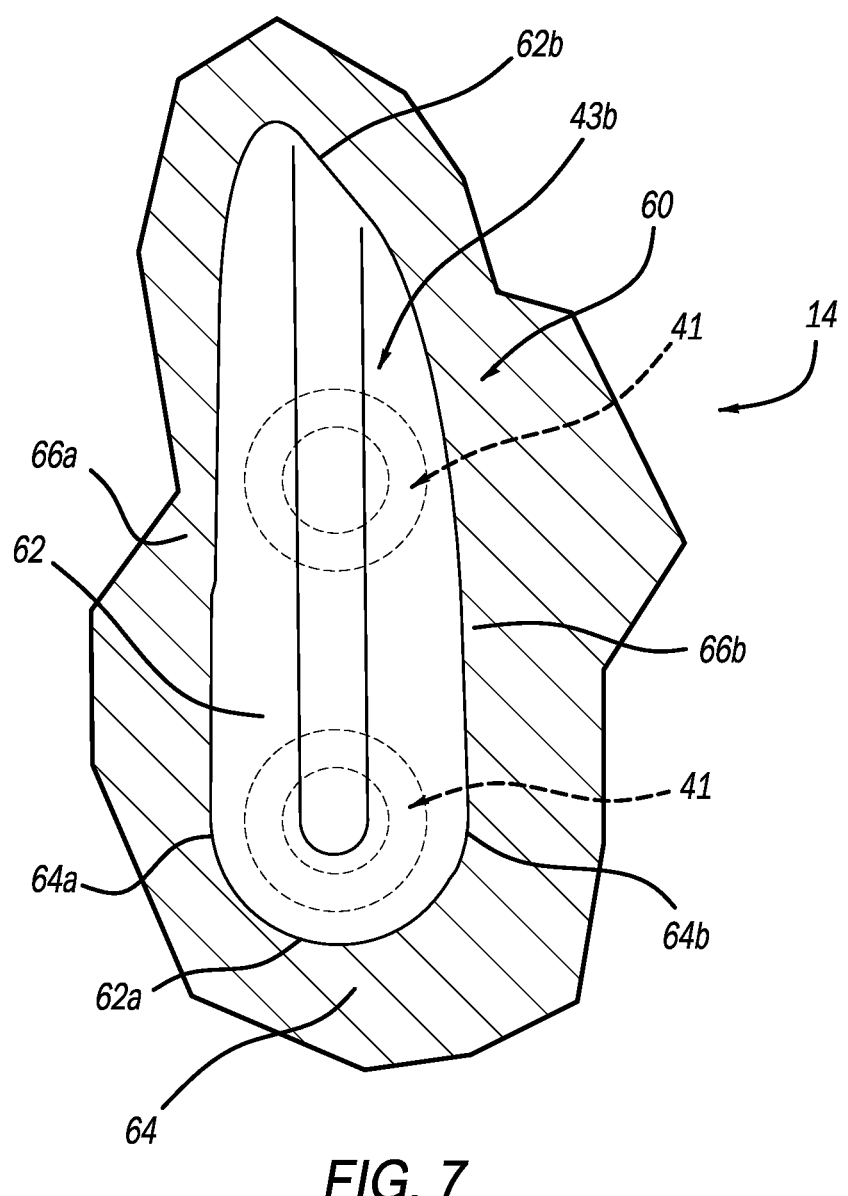
FIG. 7 is another cross-sectional view of the casting of the structural assembly of FIG. 1 through one of the pockets.

With reference to FIGS. 5-7, each pocket 43 has a non-circular shape and is recessed in-Z direction from the wall 60 of the front dash cross member 30. Each pocket 43 is sized to receive one or more cooling dies during the casting process as will be described in more detail below. In the example illustrated, the pocket 43 has a generally Kammtail virtual foil profile and is defined by a base wall 62, an arcuate wall 64, and opposed side walls 66*a*, 66*b*. The base wall 62 is planar or flat and includes a first end 62*a* and a second end 62*b* that is opposite the first end 62*a*. The first end 62*a* is arcuate. In some forms, the second end 62*b* is straight. In other forms, the second end 62*b* is angled. One or more mounting features 41 extend in the −Z direction (FIG. 6) from the base wall 62 such that the proximal ends 41*a* of the mounting features 41 are located proximate the base wall 62. The mounting features 41 extending from the base wall 62 also extend in a direction that is perpendicular to the length of the pocket 43. It should be understood that the aperture 58 in each mounting feature 41 does not extend through the base wall 62.

The arcuate wall 64 extends in the +Z direction from the base wall 62 to the wall 60. Stated different, the arcuate wall 64 extends from the base wall 62 in a direction that is opposite the direction the one or more mounting features 41 extend from the base wall 62. The arcuate wall 64 extends from the side wall 66*a* of the pocket 43 to the side wall 66*b* of the pocket 43 that is opposite the side wall 66*a*. Stated differently, a first end 64*a* of the arcuate wall 64 is located at the side wall 66*a* of the pocket 43 and a second end 64*b* of the arcuate wall 64 is located at the side wall 66*b* of the pocket 43. The side wall 66*a* extends from the first end 64*a* of the arcuate wall 64 to the second end 62*b* of the base wall 62 and the side wall 66*b* extends from the second end 64*b* of the arcuate wall 64 to the second end 62*b* of the base wall 62. In some forms, the side walls 66*a*, 66*b* are straight. In other forms, the side walls 66*a*, 66*b* are curved outward (i.e., convex) from a center of the pocket 43. A portion of the side wall 66*a* located proximate the arcuate wall 64 extends further in the +Z direction than a portion of the side wall 66*a* located proximate the second end 62*b* of the base wall 62. Similarly, a portion of the side wall 66*b* located proximate the arcuate wall 64 extends further in the +Z direction than a portion of the side wall 66*b* located proximate the second end 62*b* of the base wall 62.

Figure 8:
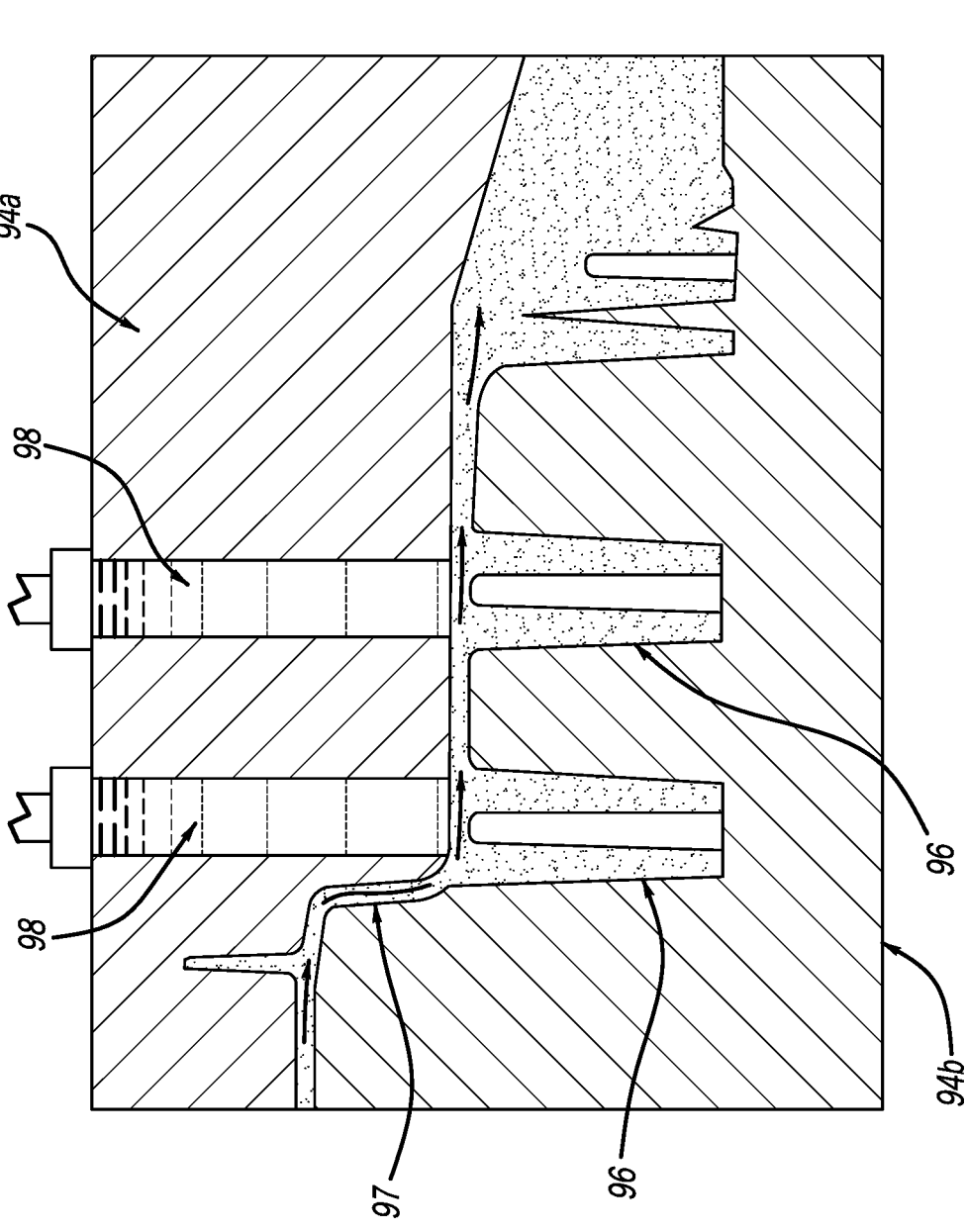
FIG. 8 is a schematic view illustrating molten flowing through a mold according to the principles of the present disclosure.
Figure 9:
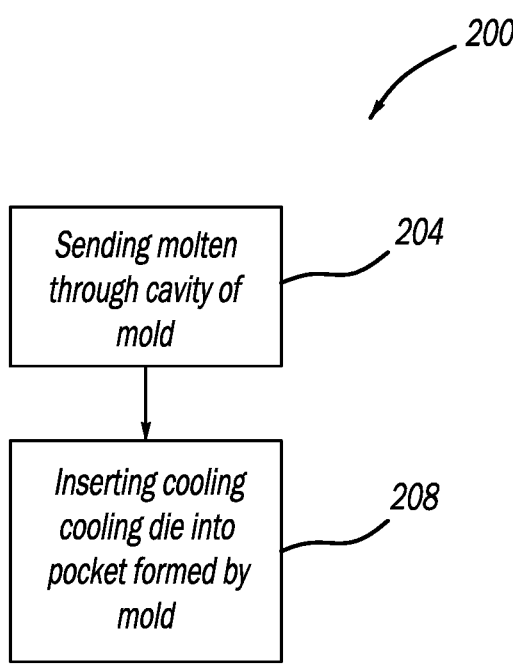
FIG. 9 is a flow chart illustrating a method of forming a structural assembly according to the principles of the present disclosure.

With reference to FIGS. 8 and 9, a method for manufacturing a part or structural casting of a vehicle 12 is provided. At 204, molten (e.g., molten aluminum) is sent or directed through a cavity of a mold 94*a*, 94*b*. The mold 94*a*, 94*b* includes a mounting feature 96 and a cooling feature 97 adjacent to the mounting feature 96. The cooling feature 97 is also shaped so as to reduce directional changes of the molten flowing through the cavity. For example, the cooling feature 97 may have a non-circular shape. In one example, the non-circular shape is a Kammtail virtual foil profile including an arcuate leading edge and a straight trailing edge. Molten flowing through the cavity flows substantially parallel to a longitudinal axis of the cooling feature 97. The Kammtail virtual foil profile of the cooling feature 97 reduces turbulence in the wake of the cooling feature 97. At 208, one or more cooling dies 98 are inserted into a space of the mold 94*a*. In this way, molten received in the mounting feature 86 may be cooled, which reduces local temperatures and any shrink porosity. In the example illustrated, the cooling dies 98 are circular shaped and have cooling fluid (e.g., water) flowing therethrough. In some forms, the cooling dies 98 may have a different shape such as oval, rectangular, square, or any other suitable shape that can be received in the space of the mold 94*a*.

The casting 14 of the present disclosure provides pockets 43 including Kammtail virtual foil profiles, which reduces local hot spots and reduces air entrainment during manufacturing of the structural casting. Although the present disclosure discloses the casting 14 of the front-end structure of the vehicle 12 having pockets 43, it should be understood that pockets 43 may be included in other parts of the vehicle 12 formed by a casting process such as hinge pillar reinforcements, mid rails, and kick down rails, for example.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A structural assembly for a vehicle comprising:
   a cast body comprising a main wall, a non-circular shaped first pocket formed in the main wall, and at least one mounting feature, the first pocket defined at least partially by a base wall and an arcuate wall, the base wall having a first end and a second opposing end, the arcuate wall extending in a first direction from the first end of the base wall to the main wall, the arcuate wall also extending from a first side of the first pocket to a second opposing side of the first pocket, wherein the at least one mounting feature extends in a second direction from the base wall that is opposite the first direction, the at least one mounting feature is configured to be coupled to a vehicle component.

2. The structural assembly of claim 1, wherein the at least one mounting feature includes a plurality of mounting features extending in the second direction from the base wall.

3. The structural assembly of claim 1, wherein the at least one mounting feature is a boss, and wherein the boss comprises an aperture extending at least partially therethrough.

4. The structural assembly of claim 3, wherein the boss comprises a length having a variable thickness.

5. The structural assembly of claim 3, wherein the boss has a proximal end and a distal end, and wherein the proximal end has a greater thickness than a thickness of the distal end.

6. The structural assembly of claim 1, wherein the first pocket has a Kammtail virtual foil profile.

7. The structural assembly of claim 1, wherein the base wall is planar.

8. The structural assembly of claim 1, wherein the cast main body further includes a non-circular shaped second pocket, and wherein the second pocket has a Kammtail virtual foil profile.

9. The structural assembly of claim 8, wherein the first pocket extends in a third direction and the second pocket extends in a fourth direction, the third direction different from the fourth direction.

10. The structural assembly of claim 1, wherein the first pocket extends perpendicular to the at least one mounting feature.

11. The structural assembly of claim 1, wherein the cast main body is a front-end structure of the vehicle, and wherein the front end structure includes a left upper rail and a right upper rail.

12. A structural assembly for a vehicle comprising:
a cast body comprising a main wall, a non-circular shaped first pocket formed in the main wall, and a plurality of bosses, the first pocket defined at least partially by a base wall and an arcuate wall, the base wall having a first end and a second opposing end that is straight, the arcuate wall extending in a first direction from the first end of the base wall to the main wall, the arcuate wall also extending from a first side of the first pocket to a second opposing side of the first pocket, wherein each boss of the plurality of bosses extend in a second direction from the base wall and comprises an aperture extending at least partially therethrough, the second direction being opposite the first direction, each boss of the plurality of bosses is configured to be coupled to a vehicle component.

13. The structural assembly of claim 12, wherein each boss has a proximal end and a distal end, and wherein the proximal end has a greater thickness than a thickness of the distal end.

14. The structural assembly of claim 12, wherein the first pocket has a Kammtail virtual foil profile.

15. The structural assembly of claim 12, wherein the cast body further includes a non-circular shaped second pocket, and wherein the second pocket has a Kammtail virtual foil profile.

16. The structural assembly of claim 15, wherein the first pocket extends in a third direction and the second pocket extends in a fourth direction, the third direction different from the fourth direction.

17. The structural assembly of claim 12, wherein the cast body is a front-end structure of the vehicle, and wherein the front end structure includes a left upper rail and a right upper rail.

18. The structural assembly of claim 12, wherein the main wall is inclined.

19. A structural assembly for a vehicle comprising:
a cast body comprising a main wall, a plurality of non-circular shaped pockets formed in the main wall, and a plurality of bosses, each pocket is defined at least partially by a base wall and an arcuate wall, the base wall having a first end and a second opposing end that is straight, the arcuate wall extending in a first direction from the first end of the base wall to the main wall, the arcuate wall also extending from a first side of the first pocket to a second opposing side of the first pocket, wherein each boss of the plurality of bosses extend in a second direction from the base wall that is opposite the first direction, each boss is configured to be coupled to a vehicle component and comprises a proximal end and a distal end, the proximal end has a greater thickness than a thickness of the distal end,
wherein a first non-circular shaped pocket of the plurality of non-circular shaped pockets extends in a third direction and a second non-circular shaped pocket of the plurality of non-circular shaped pockets extends in a fourth direction, the third direction different from the fourth direction.

20. The structural assembly of claim 19, wherein each non-circular shaped pocket of the plurality of non-circular shaped pockets has a Kammtail virtual foil profile.

* * * * *